United States Patent
Bregeault

[11] 3,719,870
[45] March 6, 1973

[54] D.C. MOTOR WITH SERIES CONNECTED WINDINGS

[75] Inventor: Marc Bregeault, Paris, France
[73] Assignee: Thomson-CSF, Paris, France
[22] Filed: Nov. 23, 1970
[21] Appl. No.: 92,048

[30] Foreign Application Priority Data

Nov. 28, 1969 France..................6941140

[52] U.S. Cl....................318/138, 318/254
[51] Int. Cl..........................H02k 29/00
[58] Field of Search..........318/138, 254, 685, 696

[56] References Cited

UNITED STATES PATENTS

| | | | |
|---|---|---|---|
| 3,153,185 | 10/1964 | Hummel, Jr. | 318/138 X |
| 3,210,631 | 10/1965 | Niccolls | 318/138 |
| 3,321,661 | 5/1967 | Toth et al. | 318/138 |
| 3,321,687 | 5/1967 | Toth | 318/138 |
| 3,465,224 | 9/1969 | Takeyasu | 318/138 |
| 3,200,315 | 8/1965 | Thompson | 318/138 |
| 3,453,514 | 7/1969 | Rakes et al. | 318/138 |
| 3,096,467 | 7/1963 | Angus et al. | 318/138 |
| 3,518,517 | 6/1970 | Rainer | 318/138 X |

Primary Examiner—Gene Z. Rubinson
Attorney—Cushman, Darby & Cushman

[57] ABSTRACT

A d.c. motor, the armature of which comprises at least two windings in two-phase arrangement, and supplied with a direct current whose direction reverses periodically. The armature windings are series-connected through inverter circuits. This arrangement improves the efficiency of the motor and the smoothness of the torque. The motor finds a wide field of applications, in particular in space engineering field.

5 Claims, 2 Drawing Figures

3,719,870

D.C. MOTOR WITH SERIES CONNECTED WINDINGS

The present invention relates to improvements in d.c. motors.

D.C. motors are known which are formed by a motor element equipped with a permanent-magnet inductor forming the rotor, a wound armature forming the stator, and an element which detects the angular position of the rotor, and is known as a resolver. More often than not, the winding of the stator is carried out as in two-phase motors. The resolver then comprises two sensing devices, for example Hall-effect plates, each of which produces a train of control signals, the two control signal trains being in phase quadrature with respect to one another. The signals from the resolver may be then linearly amplified and used to supply the stator in two-phase fashion. The motor would then operate like a two-phase induction motor but the drive torque would come from the d.c. current used to supply the amplifiers.

However, in the present state of the art the preferred approach is to employ the signals from the resolver to control inverter circuits whose function is to reverse the direction of current flow in any of the windings, each time the rotor is located on the axis of said winding. Each winding is supplied through the medium of a separate inverter circuit from a d.c. source, generally a common one. The two windings thus receive alternating voltages of rectangular waveform, phase shifted by a quarter of a cycle with respect to each other. As those skilled in the art will appreciate in the operation of these motors, the counter—e.m.f. induced in the winding by the rotor as it rotates, varies in a periodic manner; it is zero at the instant at which the commutation takes place and passes through a maximum between the two commutations in the same winding. On the other hand, the voltage applied across the winding remains constant in absolute value. This causes an increase in the current drawn in the commutation zone and therefore poor efficiency in this zone, and this has repercussions upon the overall efficiency of the motor, and results in a torque which varies in the course of each rotation of the rotor.

It is an object of this invention to avoid this drawback. The motor in accordance with the invention has an improved efficiency and a smoother torque. In other words, in this motor there is no substantial increase in the current in the commutation zone.

According to the invention, there is provided a d.c. motor, comprising firstly a motor element in the form of a wound inductor or permanent-magnet inductor, and an armature comprising at least two windings arranged in a two-phase winding arrangement and designed to be supplied from a d.c. source, the rotor of said motor taking the form either of the armature or of the inductor, and secondly an element for detecting the rotor position, which consists of a rotary member whose angular position is associated with that of the rotor, and of at least two said angular position responsive devices, said detector element controlling inverter circuits in order to reverse the direction of current flow through each armature winding with each passage of an inductor pole in front of said winding, wherein the inverter circuits are connected in series so that the d.c. source supplies the stator windings in series.

For a better understanding of the invention and to show how the same may be carried into effect, reference will be made to the drawing accompanying the ensuing description and in which.

Figure 1:
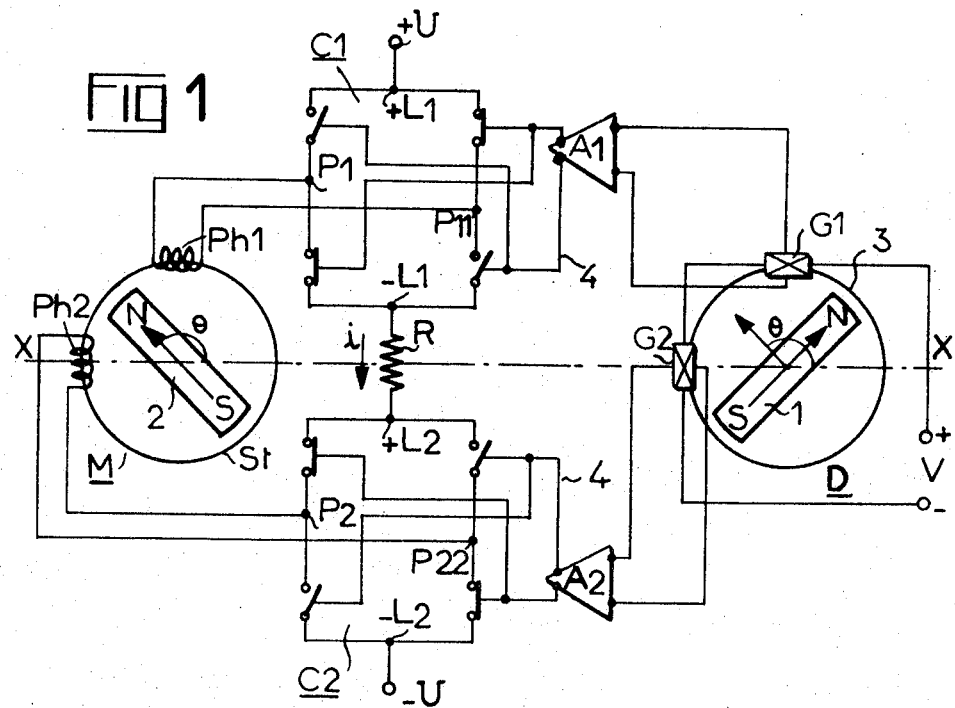
FIG. 1 illustrates, very diagrammatically, a motor in accordance with the invention, in which the position of the rotor element is detective by Hall-effect sensing devices.

The motor schematically illustrated in FIG. 1 comprises a resolver D and a motor element M in each of which a rotor is provided. The rotor 1 of the resolver and the rotor 2 of the motor element each comprise a two-pole permanent magnet; the magnets are mounted on the same axis X — X or for that matter in any other fashion which will secure between them a constant electrical phase shift of 90° (i.e., assuming they have P pairs of poles, an actual angular shift of 900°/P). The rotor 1 of the resolver rotates in a ring 3 of magnetically soft material which carries two Hall generators G1, G2 electrically shifted by 90° with respect to each other.

The Hall generators are excited in series by the current from a source V. Each of them produces a voltage whose amplitude varies as a function of the rotor position. The two voltages are in phase quadrature and are applied respectively to the inputs of two amplifiers A1, A2.

Each of the amplifiers A1, A2 has two output channels. A control signal appears in either the one or the other of the two channels of one or other of the amplifiers, each time the Hall voltage applied to this amplifier, has its polarity reversed. Because of the phase shift chosen for the resolver rotor, this kind of reversal takes place each time the motor rotor 2 passes in front of one of the two-phase windings P$h$1, P$h$2 carried by the stator St of the motor element.

Through the medium of connecting wires 4, the control signals are applied to the control electrodes of two groups C1, C2 of commutating devices, for example thyristors or other semiconductor elements connected to act as inverters. The inverter circuit used in FIG. 1 is a Wheatstone bridge circuit. Here, each of the inverter groups comprises four switching devices respectively connected in the four arms of the bridge. Two devices connected in two opposite arms are conductive when the two other devices are blocked. The devices change state in pairs when their control electrodes are supplied with the control signals coming from the amplifier with which the inverter group is associated. The stator windings P$h$1, P$h$2 are connected respectively between the terminals P1-P11 and P2-P22 of the inverter groups. Under these circumstances, it will be seen that a voltage applied across the supply terminals + L1, — L1 of one of the inverter groups produces in the corresponding stator winding P$h$1 a current whose direction reverses with each control signal, i.e., each time a pole of the motor rotor 2 passes in front of this winding.

In accordance with the invention, the two inverter groups C1, C2 are connected in series, a supply terminal −L1 of the first group being connected to a terminal + L2 of the second through a low-resistance resistor R which can be employed as a shunt for measurement purposes. A voltage U applied between the two other supply terminals $+L1, -L2$ will then produce the same current $i$ in the two stator windings $Ph1$, $Ph2$.

This series arrangement of the supply to the stator windings is not in accordance with the procedures hitherto followed where, by reason of their two-phase design, the windings had to be supplied separately. The arrangement employed in accordance with the invention yields a remarkable result. In order to appreciate this result, the manner in which the supply voltage U is distributed between the two windings with each revolution of the rotor, and what is the result and law of variation of the current will be considered. The rotor 2, as it revolves, induces a counter e.m.f. in the windings and this counter e.m.f. is sinusoidal or has some other periodic waveform determined by the design of the motor, namely the shape of the pole pieces of the rotor or the stator slots, size of the air gap, and so on. Because of the commutation of the windings supply, the counter e.m.f., whatever its phase, is always in opposition to the d.c. supply voltage. The result is that the apparent resistance of a winding (quotient of the potential difference across the terminals of said winding and the current flowing through it), is the higher the higher the instantaneous value of the counter e.m.f. Thus, in a system which feeds the windings $Ph1$, $Ph2$ in series, one of the windings has a minimal apparent resistance $r1$ whenever a pole of the rotor passes in front of it, whilst at the same instant the other winding has a maximum apparent resistance $r2$ ; this resistance has an intermediate value $r3$ which is the same for both windings when these latter are at either side of a rotor pole. In any case, the sum of the potential differences across the terminals of the two series-connected windings is virtually constant and equivalent to the supply voltage U. Thus the current $i$ flowing through the two windings will be inversely proportional to the sum of the apparent resistances and will undulate in proportions such that:

$$U/(r1+r2) \geq i \geq U/2 \cdot r3.$$

Without any particular precautions, the ripple or undulation in the current $i$ is less than 30 percent and can in fact be reduced to less than 5 percent by introducing to the motor design, some structural modifications which are well known to those skilled in the art. This shows that the arrangement in accordance with the invention has the effect of supplying the windings with a virtually constant current or at any rate one in which there is little ripple. Current peaks of the kind which occurs at the time of the commutation in motors of known kind, are therefore avoided, and thus the loss in efficiency which results from these peaks is also obviated.

In addition, the arrangement according to the invention has the advantage of smoothing out the torque during a revolution of the motor. The total motor torque resulting from the action of the two windings, can be written as:

$$(c1+c2)/i = (e1+e2)/\omega$$

$c1$ and $c2$ being the motor torques due to the windings $Ph1$ and $Ph2$ for a particular angular position of the rotor, $e1$ and $e2$ being the counter-e.m.f.'s in phase quadrature, which are developed across the terminals of these windings for said rotor position, and $\omega$ being the angular velocity of the rotor.

It can be assumed that the velocity $\omega$ is constant. Since the current $i$ is virtually constant the total torque varies as the counter e.m.f. sum. Even if the latter are sinusoidal, and more favorable waveforms can be found, the torque fluctuation is smaller than that obtained with known types of motors.

The invention has been described in relation to a motor whose rotor position detector element comprised Hall-effect sensing devices. However, it should be borne in mind that the arrangement according to the invention can equally well be applied to other kinds of motors in which the position of the rotor is detected by optical, photo-electric, magnetic, magneto-resistive or other sensing elements, and even by wiping contacts.

Figure 2:
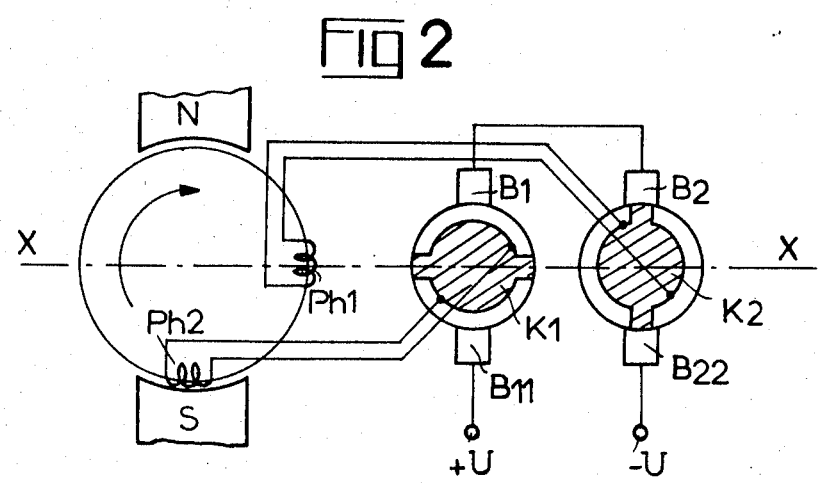
FIG. 2 shows very diagrammatically a motor in which the position of the rotor element is detected by brushes wiping on commutator segments.

FIG. 2 illustrates by way of example a motor in accordance with the invention, the detector element of which comprises two two-segment commutators K1 and K2 and two pairs of brushes B1 - B11 and B2 - B22. The inductor N-S is fixed and the armature $Ph1$ - $Ph2$ revolves. It can be seen that the brush-commutator assemblies simultaneously perform the functions of rotor position-detector and commutating element. Two brushes B1, B2 are connected to one another whilst the supply voltage U is applied between the two other brushes. Consequently, the windings $Ph1$, $Ph2$ are supplied in series.

The description just given shows that the d.c. motor according to the invention secures high efficiency and a low torque fluctuation. Trials have shown that its operating characteristics are close to those of an ideal d.c. motor; namely, it has a torque whose variation is linear from the full-load condition (corresponding to zero motor speed) up to the low-load condition (corresponding to zero torque), and an efficiency which, in the low-load condition, is virtually equal to unity.

If the motor has no commutator but merely Hall-effect plates or other contactless sensing devices, the motor in accordance with the invention can be used in space applications and, generally speaking, in all situations where it is not advisable to use contacts. On the other hand, if the motor is fitted with commutators, it can have various applications, for example as windscreen wiper motor, since its design is straightforward and economical by reason of the simplicity of the windings and the small number of commutator segments.

Of course, the invention is not limited to the embodiments described and shown which were given solely by way of example.

What is claimed, is:

1. In a d.c. motor having
    a rotor element and a stator element, with one of said elements being an inductor and the other element being an armature having at least two windings arranged in a two phase winding arrangement and adapted to be connected to a d.c. source,
    means for detecting the rotor position including a rotary member connected to said rotor for rotation therewith, and at least two angular position responsive means associated with said rotary member for each producing an electrical signal indicating the angular position of said rotary member, and at least two inverter circuit means each connected to one of said armature windings and one of said position responsive means for receiving said electrical signal produced by that position responsive means and for reversing the direction of current flow through its armature winding with each passage of an inductor pole in front of that winding, the improvement comprising:

means for connecting said at least two inverter circuit means in series so that the d.c. source supplies said stator windings in series.

2. In a motor as claimed in 1 wherein the inductor comprises a permanent magnet and constitutes the rotor.

3. In a motor as claimed in claim 1 wherein said position responsive means includes Hall-effect devices.

4. In a motor as claimed in claim 1 wherein said position responsive means includes wiping contacts.

5. In a motor as claimed in claim 2, wherein each said inverter circuit means is a Wheatstone bridge circuit, each arm of which contains a switching device, the supply diagonals of each of the bridges being connected in series, and connected across the terminals of the d.c. source.

* * * * *